United States Patent
Arakawa et al.

[11] Patent Number: 5,173,922
[45] Date of Patent: Dec. 22, 1992

[54] TEMPERATURE FLOW MEASURING SENSOR HOLDER

[75] Inventors: Hidenobu Arakawa, Tokyo; Kazumasa Tanaka, Yokohama, both of Japan

[73] Assignee: Calsonic Corporation, Tokyo, Japan

[21] Appl. No.: 783,048

[22] Filed: Oct. 28, 1991

[30] Foreign Application Priority Data

Oct. 29, 1990 [JP] Japan ................. 2-113264[U]
Jun. 6, 1991 [JP] Japan ................. 3-042279[U]
Sep. 30, 1991 [JP] Japan ................. 3-079224[U]

[51] Int. Cl.$^5$ ..................... G01K 01/16; G01K 13/02
[52] U.S. Cl. ........................... 374/135; 73/23.25; 73/204.25; 374/144
[58] Field of Search .................. 374/135, 208, 144; 73/861.21, 204.25, 23.25

[56] References Cited

U.S. PATENT DOCUMENTS

| | | | |
|---|---|---|---|
| 3,348,414 | 10/1967 | Waters et al. | 374/144 X |
| 3,451,268 | 6/1969 | Meador | 374/144 |
| 4,575,705 | 3/1986 | Gotcher | 374/208 X |
| 5,018,873 | 5/1991 | Bobo | 374/135 X |

FOREIGN PATENT DOCUMENTS 56-73612  6/1981  Japan .

*Primary Examiner*—Daniel M. Yasich
*Attorney, Agent, or Firm*—Foley & Lardner

[57] ABSTRACT

A sensor holder for holding a temperature sensor is disclosed, which comprises a first part having a first passage formed therethrough and a second part having a second passage formed therethrough. The first and second parts are so united as to coaxially connect the first and second passages thereby to constitute an elongate passage through which air flows in a direction from the first passage to the second passage. The temperature sensor is located at a given position in the first passage. A heat insulating air cavity is provided by the first part near the temperature sensor.

14 Claims, 3 Drawing Sheets

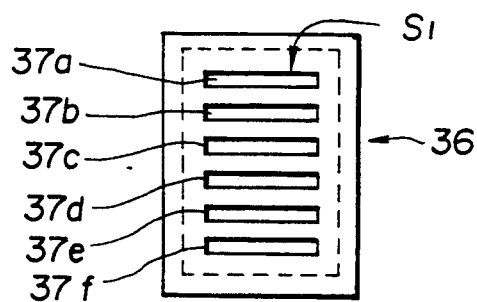
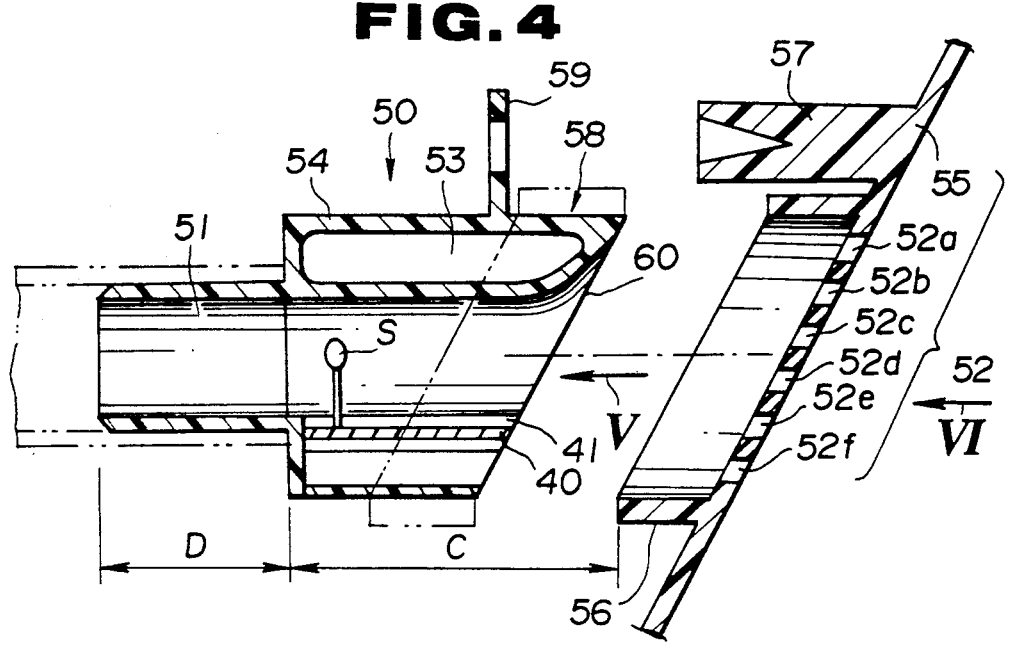
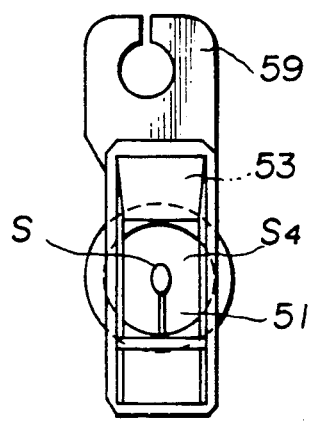

TEMPERATURE FLOW MEASURING SENSOR HOLDER

BACKGROUND OF THE INVENTION

1. Field of the Invention

The present invention relates in general to holders for holding sensors, and more particularly to holders of a type which holds a temperature sensor. More specifically, the present invention relates to holders for a temperature sensor which senses the temperature of a passenger cabin of motor vehicles.

2. Description of the Prior Art

In motor vehicles equipped with an automatic air conditioner, there are mounted various types of sensors which sense various conditions of a passenger cabin. Some of them are of a temperature sensor which senses the temperature of the passenger cabin.

Japanese Utility Model First Provisional Publication No. 56-73612 shows one holder for holding such a temperature sensor to a fixed member of a motor vehicle.

As is shown in FIG. 7 of the accompanying drawings, the holder shown in the publication is mounted to an instrument panel 1 exposed to a passenger cabin.

That is, the instrument panel 1 is formed with a bore into which a collar 12 is tightly mounted. The collar 12 has a flange part 16 exposed to the passenger cabin and an externally threaded part 18 exposed to the back side of the instrument panel 1. A grid member 17 is fitted into the flanged part of the collar 12. An annular member 13 is screwed onto the threaded part 18 of the collar 12. The annular member 13 has a passage formed therethrough. Thus, when an electric fan 5 is operated at the back side of the instrument panel 1, part of air in the passenger cabin is forced flow in the passage in the direction of the arrow.

A temperature sensor "S" is installed in the passage of the annular member 13 for sensing the temperature of air which passes through the passage. The sensor "S" shown by the publication is of a thermistor type which varies electric resistance with change of temperature.

Now, as is known, the latest motor vehicles tend to have, on the instrument panel, various heat generating devices such as radio, casette tape deck, compact disc player, lamped meters and the like. This means that the back side of the instrument panel tends to be heated considerably by such heat generating devices, due to poorly ventilated and small-sized space of the back side. Thus, when the sensor holder of the above-mentioned structure is applied to such instrument panel, the sensor holder is considerably heated and thus the air flowing therethrough is considerably heated before striking against the temperature sensor "S". In this condition, the temperature sensor "S" can not measure accurately the temperature of air in the passenger cabin.

SUMMARY OF THE INVENTION

It is therefore an object of the present invention to provide an improved holder for a temperature sensor, which is free of the above-mentioned drawback.

According to the present invention, there is provided an improved holder for a temperature sensor, which is constructed to insulate the surrounding heat from the temperature sensor.

According to a first aspect of the present invention, there is provided a sensor holder for holding a temperature sensor, which holder comprises a first part having a first passage formed therethrough; a second part having a second passage formed therethrough, the first and second parts being so united as to coaxially connect the first and second passages thereby to constitute an elongate passage through which air flows in a direction from the first passage to the second passage; locating means for locating the temperature sensor at a given position in the first passage; and cavity means for providing the first part with a heat insulating air cavity near the temperature sensor.

According to a second aspect of the present invention, there is provided, in a motor vehicle having an instrument panel, means for defining a socket portion on the instrument panel, the socket portion having in its bottom part a plurality of slits; and a sensor holder for holding a temperature sensor, which includes: a first part having a first passage formed therethrough, the first part being tightly received in the socket portion of the instrument panel; a second part having a second passage formed therethrough, the first and second parts being so united as to coaxially connect the first and second passages thereby to constitute an elongate passage through which air flows in a direction from the first passage to the second passage; locating means for locating the temperature sensor at a given position in the first passage; and cavity means for providing the first part with a heat insulating air cavity near the temperature sensor.

BRIEF DESCRIPTION OF THE DRAWINGS

Other objects and advantages of the present invention will become apparent from the following description when taken in conjunction with the accompanying drawings, in which:

FIG. 3 is a view taken from the direction of the arrow "III" of FIG. 1;

FIG. 4 is a view similar to FIG. 1, but showing a second embodiment of the present invention;

FIG. 5 is a front view of the temperature sensor holder of the second embodiment, which view is taken from the direction of the arrow "V" of FIG. 4;

DETAILED DESCRIPTION OF THE INVENTION

Figure 1:
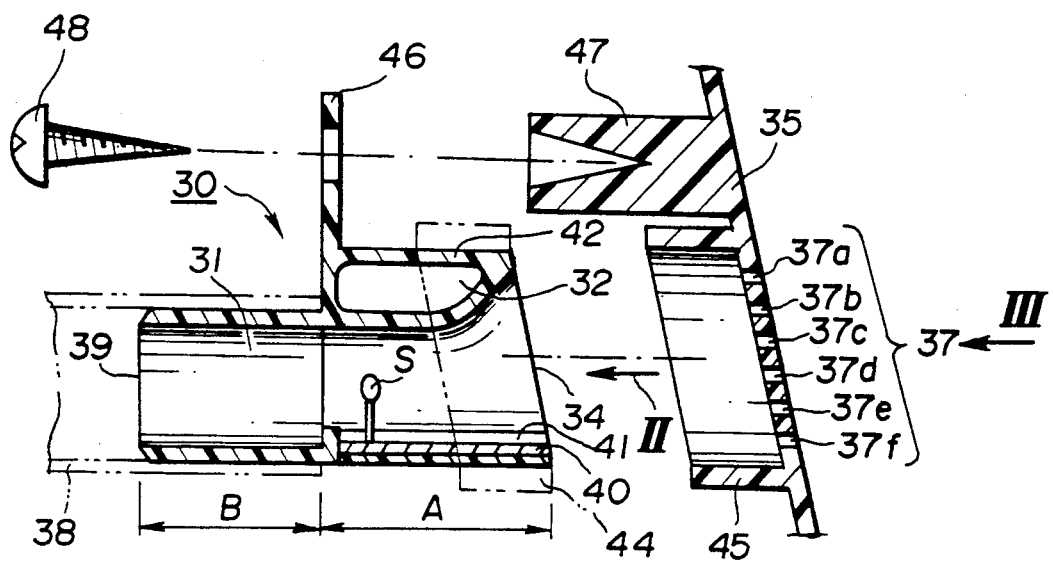
FIG. 1 is a longitudinally sectioned view of a temperature sensor holder of a first embodiment of the present invention.
Figure 2:
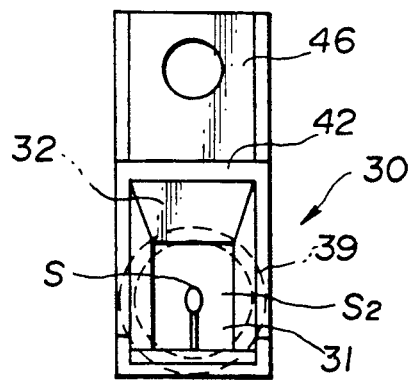
FIG. 2 is a front view of the temperature sensor holder of the first embodiment, which view is taken from the direction of the arrow "II" of FIG. 1.

Referring to FIGS. 1 to 3, particularly FIG. 1, there is shown a temperature sensor holder 30 of a first embodiment of the present invention, which is constructed of a reinforced plastic.

The sensor holder 30 is designed to be detachably mounted to a back surface of an instrument panel 35 of a motor vehicle. For this mounting, the instrument panel 35 is formed at the back surface with both a square socket portion 45 and a bolt receiving stud 47. The bolt receiving stud 47 has a small conical recess (no numeral) in its leading end portion.

As is seen from FIGS. 1 and 3, the instrument panel 35, which is constructed of a reinforced plastic, has, at a portion 37 enclosed by the square wall of the socket portion 45, a plurality of parallel slits 37a, 37b, 37c, 37d, 37e and 37f for the reason which will be clarified as the description proceeds.

As is understood from FIG. 1, the sensor holder 30 essentially consists of two hollow parts "A" and "B" which are united to have a common passage 31 defined therethrough. These parts "A" and "B" are square and cylindrical in shape respectively, as is understood from FIG. 2. That is, the part "A" has a generally rectangular cross section, while, the other part "B" has a circular cross section. Preferably, the two parts "A" and "B" are integral with each other to constitute a monolithic member.

The sensor holder 30 has, at the junction portion of the two parts "A" and "B", a mounting lug 46 projected therefrom. The mounting lug 46 has a bolt opening (no numeral) formed therein.

As is understood from FIG. 1, the square part "A" is so sized as to be snugly received in the above-mentioned square socket portion 45 of the instrument panel 35.

That is, upon requirement of assembly of the sensor holder 30 to the instrument panel 35, the square part "A" is snugly put in the square socket portion 45 of the instrument panel 35 and the mounting lug 46 is fixed to the bolt receiving stud 47 of the instrument panel 35 by means of a connecting bolt 48. For assuring sealing between the square part "A" and the square socket portion 45, a suitable sealing member 44 (which is illustrated by dotted lines) made of, for example, foamed polyurethane or the like is intimately interposed therebetween.

It is to be noted that the square part "A" has at its upper portion a heat insulating air cavity 32 which is defined by an enclosing wall 42 integral with the part "A". As shown, the mounting lug 46 constitutes a part of the enclosing wall 42 for the heat insulating air cavity 32.

A temperature sensor "S" is positioned in the square part "A" near the junction portion of the two parts "A" and "B". For this positioning, a sensor carrying plate 40 is used, which is slidably engaged with opposed grooves 41 formed in the square part "A".

It is to be noted that the positioning of the temperature sensor "S" is so made that at least a part of the heat insulating air cavity 32 is located upstream of the sensor "S".

The sensor "S" is of a diode type thermistor or the like. The square part "A" has an air inlet portion 34 whose upper portion is tapered toward the temperature sensor "S".

The sectional area "S2" of the passage 31 of the sensor holder 30 at the position where the temperature sensor "S" is located and the sectional area "S1" of the parallel slits 37a, 37b, 37c, 37d, 37e and 37f of the instrument panel 35 should be so determined as to minimize any influence caused by the self-heat generation of the sensor "S". For example, if the sectional area "S1" of the parallel slits is about 112.5 mm$^2$, the sectional area "S2" of the passage 31 at the position of the sensor "S" should be determined about 112 mm$^2$ or somewhat less.

The cylindrical portion "B" is the portion to which a duct 38 extending from an aspirator (not shown) is fixed. Thus, upon operation of the aspirator, part of air in the passenger cabin is forced into the passage 31 of the sensor holder 30 from the slit portion 37 of the instrument panel 35, and led to the aspirator.

Because of provision of the sealed heat insulating air cavity 32 upstream of the temperature sensor "S", the air fed into the passage 31 of the sensor holder 30 from the passenger cabin is suppressed from being heated or the temperature increase of the air is at least minimized. Thus, the temperature sensor "S" can accurately measure the temperature of air in the passenger cabin.

Figure 6:
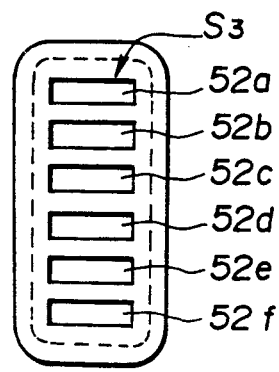
FIG. 6 is a view taken from the direction of the arrow "VI" of FIG. 4.

Referring to FIGS. 4 to 6, particularly FIG. 4, there is shown a temperature sensor holder 50 of a second embodiment of the present invention, which is constructed of a reinforced plastic.

For detachably mounting thereto the sensor holder 50, the instrument panel 55, which is constructed of a reinforced plastic, is formed at a back surface with both a square socket portion 56 and a bolt receiving stud 57. The bolt receiving stud 57 has a small conical recess (not shown) in its leading end portion.

Figure 7:
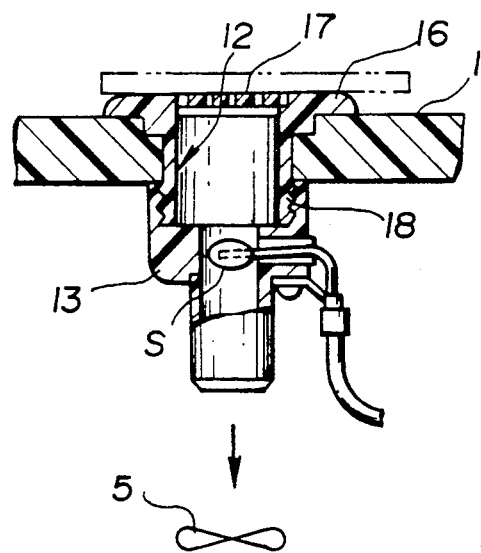
FIG. 7 is a sectional view of a conventional temperature sensor holder.

As is seen from FIGS. 4 and 7, the instrument panel 55 has, at a portion 52 enclosed by the square wall of the socket portion 56, a plurality of parallel slits 52a, 52b, 52c, 52d, 52e and 52f.

As is understood from FIG. 4, the sensor holder 50 of the second embodiment essentially consists of two hollow parts "C" and "D" which are united to have a common passage 51 defined therethrough. These parts "C" and "D" are square and cylindrical in shape respectively, like in the case of the above-mentioned first embodiment.

The square part "C" is so sized as to be snugly received in the square socket portion 56 of the instrument panel 55. For assuring sealing between the square part "C" and the square socket portion 56, a suitable sealing member 58 is intimately interposed therebetween.

The square part "C" has at its upper portion a heat insulating air cavity 53 which is defined by an enclosing wall 54 integral with the part "C". A mounting lug 59 is integrally formed on the upper portion of the square part "C", which is a bolt opening (no numeral) formed therein.

A temperature sensor "S" is positioned in the square part "C" near the junction portion between the two parts "C" and "D". For this positioning, a sensor carrying plate 40 is used, which is slidably engaged with opposed grooves 41 formed in the square part "C".

It is to be noted that the positioning of the temperature sensor "S" is so made that at least a part of the heat insulating air cavity 53 is located upstream of the sensor "S".

The square part "C" has an air inlet portion 60 whose upper portion is tapered toward the temperature sensor "S".

The sectional area "S4" of the passage 51 of the sensor holder 50 at the position where the temperature sensor "S" is located and the sectional area "S3" of the parallel slits 52a, 52b, 52c, 52d, 52e and 52f of the instrument panel 55 should be so determined as to minimize any influence caused by the self-heat generation of the sensor "S". If the sectional area "S3" of the parallel slits is about 159.6 mm$^2$, the sectional area "S4" of the passage 51 at the position of the sensor "S" should be determined about 104 mm$^2$ or somewhat less.

In the following, advantages of the present invention will be itemized.

First, due to provision of the heat insulating air cavity 32 or 53 upstream of the temperature sensor "S", the air fed to the sensor from the passenger cabin is prevented from being heated even when the surrounding air is heated considerably by the heat generating devices on the instrument panel 35 or 55. That is, the heat insulating air cavity 32 or 53 can serve as a so-called "heat radiation screen". Thus, the temperature sensor "S" can accurately measure the temperature of air in the passenger cabin.

Second, due to provision of the tapered mouth portion 34 or 60, the air from the passenger cabin can be smoothly introduced into the air intake passage 31 or 51 of the sensor holder 30 or 50.

Third, since the sectional area "S2" or "S4" of the passage 31 or 51 of the sensor holder 30 or 50 at the position where the temperature sensor "S" is located and the sectional area "S1" or "S3" of the parallel slits of the instrument panel 35 or 55 are so determined as to minimize any influence caused by the self-heat generation of the sensor "S", the accurate measurement of the air temperature is much assured.

In the following, modifications of the present invention will be described.

First, if desired, the heat insulating air cavity 32 or 53 may be so constructed as to surround the air intake passage 31 or 51 of the sensor holder 30 or 50.

Second, If desired, the heat insulating air cavity 32 or 53 may be provided by a separate hollow member which is intimately mounted on the sensor holder.

Third, if desired, the heat insulating air cavity 32 or 53 may be filled with heat insulating material, such as glass wool or the like.

What is claimed is:

1. A sensor holder for holding a temperature sensor, comprising:
    a first part having a first passage formed therethrough;
    a second part having a second passage formed therethrough, said first and second parts being so united as to coaxially connect said first and second passages thereby to constitute an elongate passage through which air flows in a direction from said first passage to said second passage;
    locating means for locating said temperature sensor at a given position in said first passage; and
    cavity means for providing said first part with a heat insulating air cavity near said temperature sensor.

2. A sensor holder as claimed in claim 1, in which said heat insulating air cavity is defined by an enclosing wall which is integral with said first part.

3. A sensor holder as claimed in claim 2, in which said first passage has a tapered air inlet part for achieving a smoothed air flow thereinto.

4. A sensor holder as claimed in claim 3, in which said first and second parts are integral with each other to constitute a monolithic member.

5. A sensor holder as claimed in claim 4, in which said monolithic member is constructed of a reinforced plastic.

6. A sensor holder as claimed in claim 3, in which at least a part of said heat insulating air cavity is positioned upstream of said temperature sensor with respect to the air flowing direction.

7. A sensor holder as claimed in claim 3, in which said locating means comprises:
    means for defining opposed grooves in said first passage; and
    a sensor carrying plate slidably engaged with said opposed grooves, said sensor carrying plate carrying said temperature sensor.

8. In a motor vehicle having an instrument panel,
    means for defining a socket portion on said instrument panel, said socket portion having in its bottom part a plurality of slits; and
    a sensor holder for holding a temperature sensor, which includes:
    a first part having a first passage formed therethrough, said first part being tightly received in said socket portion of said instrument panel;
    a second part having a second passage formed therethrough, said first and second parts being so united as to coaxially connect said first and second passages thereby to constitute an elongate passage through which air flows in a direction from said first passage to said second passage;
    locating means for locating said temperature sensor at a given position in said first passage; and
    cavity means for providing said first part with a heat insulating air cavity near said temperature sensor.

9. A motor vehicle as claimed in claim 8, in which said heat insulating air cavity is defined by an enclosing wall which is integral with said first part, and in which said first and second parts are integral with each other to constitute a monolithic member.

10. A motor vehicle as claimed in claim 9, in which the sectional area of said first passage at the position where said temperature sensor is located is smaller than the area of said slits of the instrument panel.

11. A motor vehicle as claimed in claim 9, in which said monolithic member is constructed of a reinforced plastic.

12. A motor vehicle as claimed in claim 9, in which at least a part of said heat insulating air cavity is positioned upstream of said temperature sensor with respect to the air flowing direction.

13. A motor vehicle as claimed in claim 9, in which said first passage has a tapered mouth portion to achieve a smoothed air flow thereinto.

14. A motor vehicle as claimed in claim 9, in which said locating means comprises:
    means for defining opposed grooves in said first passage; and
    a sensor carrying plate slidably engaged with said opposed grooves, said sensor carrying plate carrying said temperature sensor.

* * * * *